(12) United States Patent
Nakashima et al.

(10) Patent No.: US 8,289,416 B2
(45) Date of Patent: Oct. 16, 2012

(54) IMAGING APPARATUS, IMAGE RECORDING MEDIUM, AND METHOD OF SETTING QUALITY OF CAPTURED IMAGE

(75) Inventors: Yasutaka Nakashima, Kanagawa (JP); Katsumi Kaneko, Kanagawa (JP)

(73) Assignee: Sony Corporation (JP)

( * ) Notice: Subject to any disclaimer, the term of this patent is extended or adjusted under 35 U.S.C. 154(b) by 486 days.

(21) Appl. No.: 11/804,009

(22) Filed: May 15, 2007

(65) Prior Publication Data

US 2007/0268535 A1    Nov. 22, 2007

(30) Foreign Application Priority Data

May 17, 2006  (JP) .............................. P2006-137890

(51) Int. Cl.
  *H04N 5/76* (2006.01)
  *H04N 5/77* (2006.01)
  *H04N 9/80* (2006.01)
(52) U.S. Cl. ...................... 348/231.7; 386/224; 386/247
(58) Field of Classification Search ............. 348/231.99, 348/231.3, 231.6–231.9; 386/224, 247
  See application file for complete search history.

(56) References Cited

U.S. PATENT DOCUMENTS

| | | | | |
|---|---|---|---|---|
| 5,300,974 A | * | 4/1994 | Stephenson, III ............. | 396/311 |
| 5,477,264 A | * | 12/1995 | Sarbadhikari et al. ...... | 348/231.6 |
| 6,327,001 B1 | * | 12/2001 | Yamagishi ..................... | 348/552 |
| 7,024,051 B2 | * | 4/2006 | Miller et al. ................... | 382/263 |
| 7,420,597 B2 | * | 9/2008 | Aizawa et al. ............. | 348/231.9 |
| 7,432,952 B2 | * | 10/2008 | Fukuoka .................... | 348/207.1 |
| 7,554,579 B2 | * | 6/2009 | Terasawa ................... | 348/231.6 |
| RE40,865 E | * | 8/2009 | Anderson .................. | 348/231.6 |
| 2002/0018130 A1 | * | 2/2002 | Suemoto et al. ............. | 348/231 |
| 2003/0037331 A1 | * | 2/2003 | Lee ................................ | 725/32 |

FOREIGN PATENT DOCUMENTS

| | | |
|---|---|---|
| JP | 7-226906 | 8/1995 |
| JP | 2000-134519 | 5/2000 |
| JP | 2000134519 | * 5/2000 |
| JP | 2001-298647 | 10/2001 |
| JP | 2004-179883 A | 6/2004 |
| JP | 2005-012687 | 1/2005 |

* cited by examiner

*Primary Examiner* — Nhan T Tran
*Assistant Examiner* — Tuan Le
(74) *Attorney, Agent, or Firm* — Lerner, David, Littenberg, Krumholz & Mentlik, LLP

(57) ABSTRACT

An imaging apparatus operating on the basis of setting information determining quality of a captured image. The apparatus includes: imaging means for performing image processing in accordance with the setting information; image-signal processing means for performing signal processing of the image captured in accordance with the setting information; when a read request is input in a state of being connected with an image recording medium including setting-information recording means storing specific setting information recording a setting value for obtaining a specific image quality and image-information recording means recording image information including captured image data, setting-information reading means for reading the specific setting information stored in the setting-information recording means of the medium; and control means for changing the setting information on the imaging means and the image-signal processing means on the basis of the specific setting information and controlling the imaging means and the image-signal processing means.

13 Claims, 8 Drawing Sheets

FIG. 7

| TYPE 310 | WHITE BALANCE 320 | SENSITIVITY (GAIN) 330 | GAMMA CHARACTERISTIC 340 | CONTOUR CORRECTION 350 |
|---|---|---|---|---|
| STANDARD | DAYLIGHT | STANDARD | STANDARD | NONE |
| SETTING A | TUNGSTEN | FOUR TIMES | GAMMA A | WEAK |
| SETTING B | DAYLIGHT | DOUBLE | GAMMA B | STRONG |
| SETTING C | TUNGSTEN | STANDARD | GAMMA C | NORMAL |

IMAGING APPARATUS, IMAGE RECORDING MEDIUM, AND METHOD OF SETTING QUALITY OF CAPTURED IMAGE

CROSS REFERENCES TO RELATED APPLICATIONS

The present invention contains subject matter related to Japanese Patent Application JP 2006-137890 filed in the Japanese Patent Office on May 17, 2006, the entire contents of which are incorporated herein by reference.

BACKGROUND OF THE INVENTION

1. Field of the Invention

The present invention relates to an imaging apparatus, an image recording medium, and a method of setting the quality of a captured image. More particularly, the present invention relates to an imaging apparatus operating on the basis of setting information determining the quality of a captured image, an image recording medium for recording image information generated by the imaging apparatus, and a method of setting the quality of an image captured by the imaging apparatus.

2. Description of the Related Art

To date, when a cameraman shoots a film and a photographer takes a photograph using a cinema-film camera and a silver-still camera, respectively, it has been customary for them to select one of the various films that are on the market in order to set the intended image quality.

Various kinds of films that are used for cinema-film cameras and silver-still cameras are marketed with various characteristics, such as a sensitivity, tungsten/daylight, monochrome/color, etc., that are determined individually in accordance with the weather of a shooting date, a shooting situation, the quality of an obtained image, etc. The cameraman and photographer have been selecting a film that allows obtaining a desired image quality with reference to the various characteristics of the film described on the package, etc. In this manner, it has been possible for the cameraman and photographer to obtain the intended image quality by selecting a film without setting the cinema-film cameras and the silver-still cameras in particular.

In recent years, digital cinema cameras and digital still cameras have become widespread in place of such cinema-film cameras and silver-still cameras, respectively. For digital cinema cameras and digital still cameras, it is necessary to obtain a desired image quality by individually setting the various characteristics, such as a sensitivity, color temperature, etc. Thus, there are many items to be set, and the operation for the setting has been troublesome. In particular, for a photographer who is accustomed to obtain the intended image quality by selecting a film, it has been difficult to obtain the intended image quality by the operation of setting individual setting items, because that operation is quite different from the selection of a film, which has been carried out up to date.

Accordingly, a method of adjusting the quality of an image has been proposed by storing a plurality of parameter groups in accordance with the shooting situations for digital cinema cameras and digital still cameras in a predetermined storage section in advance and allowing the photographer to select a desired parameter group (for example, refer to Japanese Unexamined Patent Application Publication No. 2004-179883).

SUMMARY OF THE INVENTION

However, in a know method of setting the quality of the image captured by digital cinema cameras and digital still cameras, there has been a problem in that it is necessary to make a selection and perform the registration operation from a plurality of parameter groups provided in advance in order to obtain a desired image quality.

In the known setting of an image quality, a plurality of parameter groups are stored in the storage section of the main unit of a camera or a recording medium, such as a semiconductor medium, which is removable from a camera. In order to obtain a desired image quality, it is necessary to read the parameter groups by a menu shown on the display unit, etc., and to select a desired parameter group in order to reflect the setting on the apparatus. Japanese Unexamined Patent Application Publication No. 2004-179883 has disclosed a method of displaying the film brands, for example "Company A XX1" or "Company B YYY" in this menu. However, a troublesome operation, in which it is necessary for the photographer to search for a desired film brand from the menu and to perform a selection operation, is not eliminated.

Also, it is necessary to select a parameter group from the settings recorded in the camera main-unit or the removable recording medium. Accordingly, it is necessary to provide a larger number of parameter groups in order to increase the number of options. However, there is a problem in that the storage capacity becomes larger and the selection operation becomes more complicated as the number of parameter groups increases. Also, in general, the parameter group selected by one photographer is often limited by the preference of the photographer, etc. Thus, there is also a problem in that the storage section of the camera main-unit or the storage area of the removable recording medium is used up by the parameter groups which are not used in practice.

The present invention has been made in view of these points. It is desirable to provide an imaging apparatus, a captured-image information recording medium, and a method of setting the quality of a captured image, which are capable of selecting the image quality in such a manner as selecting the image quality by a known film selection without performing troublesome setting operations.

According to an embodiment of the present invention, there is provided an imaging apparatus operating on the basis of setting information determining quality of an image to be captured, the imaging apparatus including: imaging means; image-signal processing means; setting-information reading means; and control means. The imaging means performs image processing in accordance with the setting information. The image-signal processing means performs signal processing of the image captured by the imaging means in accordance with the setting information. When a read request is input in a state of being connected with an image recording medium including setting-information recording means storing specific setting information recording a setting value for acquiring a specific image quality and image-information recording means recording image information including captured image data, the setting-information reading means reads the specific setting information stored in the setting-information recording means of the image recording medium. The control means changes the setting information on the imaging means and the image-signal processing means on the basis of the specific setting information read by the setting-information recording means and controls the imaging means and the image-signal processing means.

By such an imaging apparatus, the setting-information reading means reads the specific setting information recording the setting value for obtaining a specific image quality recorded in the setting-information recording means of the image recording medium recording the captured image information. The control means updates the setting information on the imaging means and the image-signal processing means on the basis of the specific setting information read. Thus, the imaging means and the image-signal processing means operate on the basis of the specific setting information, and thus it becomes possible to obtain the image information having the set specific image quality subsequently. In this regard, if an image recording medium recording the specific setting information having a different image-quality characteristic in the setting-information recording means, it is possible to obtain the image quality in accordance with the specific setting information.

According to another embodiment of the present invention, there is provided an image recording medium for recording image information including image data generated by an imaging apparatus operating on the basis of setting information determining quality of an image to be captured, the image recording medium including: image-information recording means for recording the image information to be written by the imaging apparatus through image-information writing means of the imaging apparatus; and setting-information recording means for recording specific setting information recording a setting value for acquiring a specific image quality read by setting-information reading means of the imaging apparatus when the imaging apparatus sets the setting information.

Such an image recording medium includes the image recording means for recording the image information generated by the imaging application and the setting-information recording means recording the specific setting information for obtaining the specific image quality of the recorded image intended by the photographer. The imaging apparatus to which this image recording medium is connected reads the specific setting information from the setting-information recording means by the setting-information reading means, and changes the setting information on the imaging means and the image-signal processing means to the values of the specific setting information. Thus, when a image recording medium storing a desired specific setting information is connected to the imaging apparatus, the imaging apparatus generates the image information of a desired image quality, and records the image information into the image-information recording means.

According to another embodiment of the present invention, there is provided a method of setting an image-capturing quality of an imaging apparatus operating on the basis of setting information determining quality of an image to be captured, the method including the steps of: when a read request is input in a state of being connected with an image recording medium including image-information recording means recording image information including image data generated by the imaging apparatus and setting-information recording means recording specific setting information recording a setting value for acquiring a specific image quality, setting-information reading means of the imaging apparatus reading for reading the specific setting information stored in the setting-information recording means of the image recording medium; and controlling for changing the setting-information value on the imaging means for performing image processing and the image-signal processing means for processing an image signal captured by the imaging means on the basis of the specific setting information read by setting-information recording means and controlling the imaging means and the image-signal processing means.

By such a method of setting the quality of a captured image, the setting-information recording means provided for the image recording medium including image-information recording means for recording the image information generated by the imaging apparatus records the specific setting information recording the setting values for obtaining the specific image quality. When the image recording medium is connected to the imaging apparatus and a read request is input, the imaging apparatus reads the specific setting information from the setting-information recording means, and changes the setting information on the imaging means and image-signal processing means in accordance with the specific setting information. Thus, the setting information for obtaining a desired quality of a captured image is set in the imaging apparatus.

In the present invention, the image-information recording medium for recording the captured image information is provided with the setting-information recording means for recording predetermined setting information determining the quality of a captured image, and the specific setting information registering the setting values for obtaining a specific image quality is recorded. For example, if a plurality of image-information recording media which record the specific setting information for achieving the image qualities having individually different characteristics are provided, it is possible for the photographer to select the image-information recording medium recording the specific setting information for achieving a desired image quality. The imaging apparatus reads the setting information from the connected image-information recording medium, and reflects the setting information onto the imaging means and the image-signal processing means.

Thus, when the photographer selects an image-information recording medium recording the specific setting information capable of obtaining the intended image quality, and connects it to the imaging apparatus, it is possible for the photographer to obtain the image having the desired image quality without setting the imaging apparatus.

BRIEF DESCRIPTION OF THE DRAWINGS

FIG. 7 is a diagram illustrating an example of specific setting information according to the present embodiment.

DESCRIPTION OF THE PREFERRED EMBODIMENTS

In the following, a description will be given of an embodiment of the present invention with reference to the drawings. First, a description will be given of the concept of the present invention applied to an embodiment, and then the specific contents of the embodiment will be described.

Figure 1:
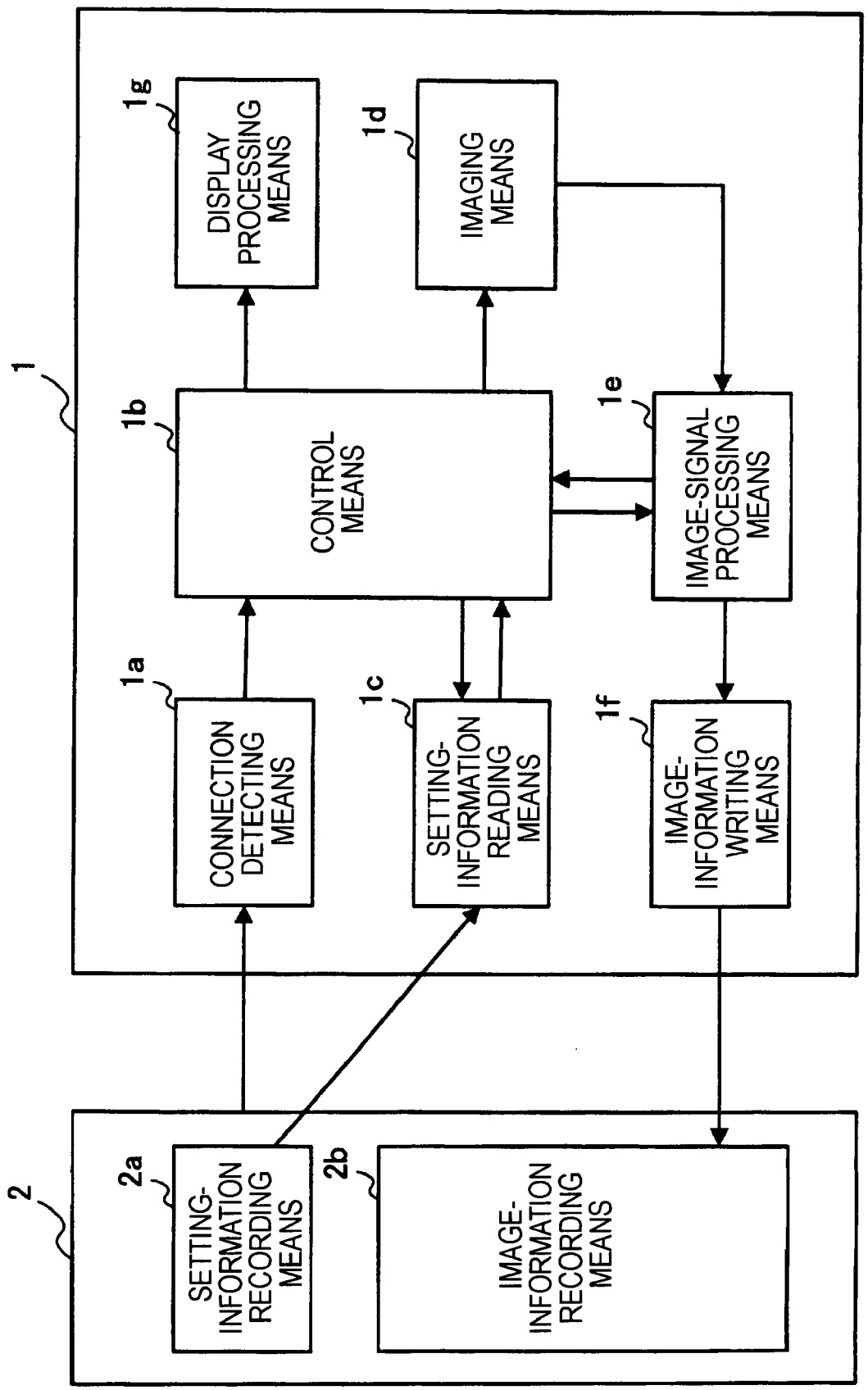
FIG. 1 is a schematic diagram of the invention applied to an embodiment.

FIG. 1 is a schematic diagram of the invention applied to the embodiment.

An imaging apparatus 1 according to the present invention operates on the basis of the setting information that determines the quality of a captured image. The image information including the captured image data is written into an exchangeable image recording medium 2.

The imaging apparatus 1 has connection detecting means 1a for detecting the connection of the image recording medium 2, control means 1b for controlling the entire apparatus, setting-information reading means 1c for reading specific setting information stored in the image recording medium 2, imaging means 1d for performing image capturing processing in accordance with the setting information, image-signal processing means 1e for performing image signal processing in accordance with the setting information, image-information writing means 1f for writing the image information into the image recording medium 2, and display processing means 1g for displaying predetermined information. Also, the image recording medium 2 includes setting-information recording means 2a and image-information recording means 2b.

First, a description will be given of each means of the image recording medium 2.

The setting-information recording means 2a stores specific setting information recording a setting value for obtaining a specific image quality. The specific setting information records a setting value allowing to obtain a specific image quality on each setting item to determine the image quality, for example white balance, monochrome/color, sensitivity, gamma characteristic, etc. Also, the specific setting information recorded in the setting-information recording means 2a is only one kind. Accordingly, in the same manner that a plurality of kinds of films having different characteristics are provided for a known film camera, a plurality of image recording media 2 for recording specific setting information having different setting values are provided. For example, the specific setting information records the setting values such that the image quality obtained is similar to the film characteristic in accordance with a known film characteristic.

The image-information recording means 2b stores the image information generated by the connected imaging apparatus 1. Also, although not shown in the figure, it is also possible to read the image information to be stored from the imaging apparatus 1.

The image recording medium 2 like this includes any recording medium, such as a magnetic tape, a magnetic disk, an optical disc, a semiconductor memory, etc. The image recording medium 2 is removable from the imaging apparatus 1. The image recording medium 2 to be used is exchanged as necessary. Also, the setting-information recording means 2a and the image-information recording means 2b are not necessarily included in the same recording medium. An example of the configuration will be described later.

In this regard, as described above, since there are a plurality of kinds of image recording media 2 having different specific characteristic information stored in the setting-information recording means 2a, it is necessary to make then distinguishable from the outside. Thus, the identification allowing to identify the specific setting information stored in the setting-information recording means 2a is given on the main-unit surface or side face of the image recording medium 2, the package of the recording means 2a, etc. A label on which the identification information is printed may be attached on the main-unit surface or side face. For identification, for example the values of the setting items recorded in the specific setting information are described on the label or the package. Also, when the specific setting information similar to a film characteristic is recorded, a brand of the film similar to the film characteristic, etc., may be described. Also, the color, shape, design, etc., of the label or package are changed in accordance with the kinds of predetermined items (for example, a difference in sensitivity) of the specific setting information. In addition, there are many kinds of methods for visually distinguishing the specific setting information stored. In the present embodiment, any one of the methods among them may be used.

Next, a description will be given of each means of the imaging apparatus 1.

The connection detecting means 1a determines whether the image recording medium 2 is connected. If the image recording medium 2 has been newly connected, the connection detecting means 1a notifies it to the control means 1b. Also, the connection detecting means 1a may typically notify whether the image recording medium 2 is connected to the control means 1b.

The control means 1b controls the entire apparatus. When the control means 1b is notified that an image recording medium 2 has been newly connected by the connection detecting means 1a, the control means 1b reads the specific setting information stored in the setting-information recording means 2a of the image recording medium 2 through the setting-information reading means 1c. In this regard, the reading of the setting information may be started by a request from the photographer, which is input by a switch, etc. When the specific setting information is read, the control means 1b changes the data of the setting information on the imaging means 1d and the image-signal processing means 1e to the setting values recorded in the specific setting information. Also, the control means 1b performs the control of the start and the end of the imaging means 1d, the image-signal processing means 1e, the image-information writing means 1f, and the display processing means 1g, etc.

The setting-information reading means 1c reads the specific setting information stored in the recording means 2a of the image recording medium 2 in accordance with an instruction from the control means 1b. In this regard, the reading may be automatically performed when the connection detecting means 1a has detected the connection.

The imaging means 1d performs the imaging processing in accordance with the setting information set by the control means 1b.

The image-signal processing means 1e processes the image signal generated by the imaging means 1d in accordance with the setting information set by the control means 1b.

The image-information writing means 1f writes the image information generated by the image-signal processing means 1e into the image-information recording means 2b of the image recording medium 2 in accordance with an instruction from the control means 1b.

The display processing means 1g displays the image based on the image information, the contents of the setting information, etc., onto the display screen in accordance with an instruction of the control means 1b.

A description will be given of the operation and the method of setting the quality of a captured image of the imaging apparatus 1 and the image recording medium 2 having such configurations.

The setting-information recording means 2a of the image recording medium 2 stores the specific setting information recording the setting values for obtaining a specific image quality. The photographer selects the image recording medium 2 recording the specific setting information for obtaining the intended image quality by the label attached to the image recording medium 2, the package, or the like. When the selected image recording medium 2 is connected to the imaging apparatus 1, in the imaging apparatus 1, the connection detecting means 1a detects that the image recording medium 2 has been connected, and notifies it to the control means 1b. The control means 1b reads the specific setting information recorded in the setting-information recording means 2a of the image recording medium 2 connected through the setting-information reading means 1c. Then, the setting values of the specific setting information that has been read are reflected onto the setting information of that apparatus. Thus, the imaging means 1d and the image-signal processing means 1e generate the image information having the image quality intended by the photographer in order to execute the processing based on the specific setting information. The generated image information is recorded into the image-information recording means 2b of the image recording medium 2 through the image-information writing means 1f. Also, if a request from the photographer is input, the display processing means 1g displays the image or the setting information onto the display screen. Thus, the photographer can confirm the image quality and the settings.

In this manner, the specific setting information recorded in the image recording medium 2 is automatically set without performing troublesome setting operations by the present invention, and the imaging apparatus 1 generates the image having the image quality in accordance with the set specific setting information. Since the image recording medium 2 records only one type of specific setting information, it becomes unnecessary to perform troublesome operations, such as the selection of the settings by a menu. For example, if the image recording media 2 having different pieces of specific setting information to be recorded are provided in accordance with the film characteristics, the photographer can obtain a desired quality of a captured image only by selecting the image recording medium 2 recording the specific setting information allowing the intended image quality and by inserting the medium into the imaging apparatus 1 in the same manner as a known film selection.

Also, since specific setting information is recorded in the image recording medium 2, it is possible to register arbitrary specific setting information at the time of producing the image recording medium 2. Accordingly, it is possible to increase the options of the setting easily.

In the following, a detailed description will be given of an embodiment by taking, as an example, the case where the present invention is applied to a digital camera of the type for recording the image information including the captured image data into a removable recording medium with reference to the drawings. In this regard, the digital camera may be a digital cinema camera for shooting moving images, or a digital still camera for taking a photograph.

Figure 2A:
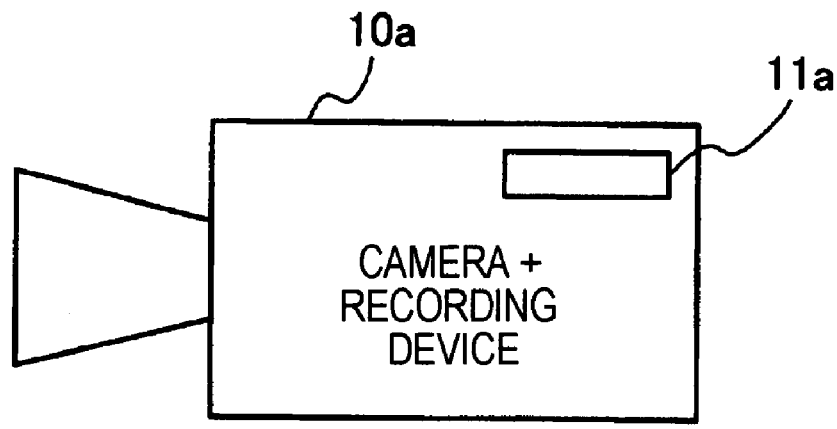
FIG. 2A is a diagram illustrating an example of the configuration of a digital camera according to an embodiment of the present invention.
Figure 2B:
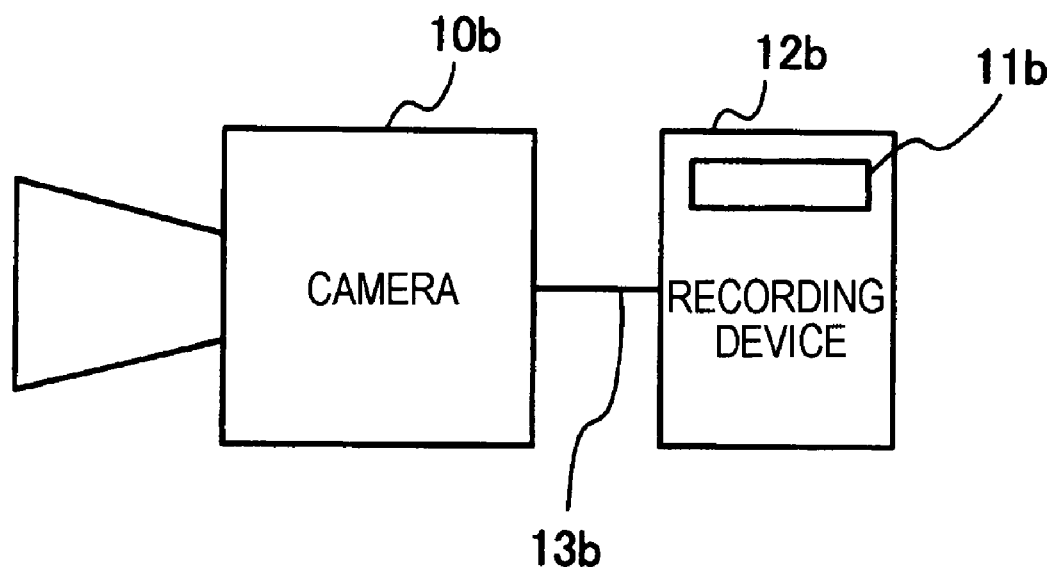
FIG. 2B is a diagram illustrating an example of the configuration of a digital camera according to an embodiment of the present invention.

FIGS. 2A and 2B are diagrams illustrating examples of the configuration of a digital camera according to an embodiment of the present invention.

FIG. 2A is an example of an integrated type, and FIG. 2B is an example of a separated type.

The integrated type is a camera 10a in which a camera for shooting and a recording device for reading from and writing to a recording medium are integrated. Accordingly, the camera 10a internally has an insert slot to which a removable recording medium is inserted and a recording-medium reading/writing device 11a having a function of reading and writing.

In the separated type, a camera 10b and a recording device 12b are separated, and the camera 10b and the recording device 12b are connected through a communication cable 13b. A recording-medium reading/writing device 11b is disposed in the recording device 12b.

In such a type, before the camera 10b is separated for shooting, it is necessary to connect the camera 10b and the recording device 12b, and to read the specific setting information recorded in the recording medium into the camera 10b. The subsequent processing is performed in the same manner as the integrated type.

In this regard, when the image signal processing is performed by an external image processing apparatus, not by the camera 10a, the camera 10b, nor the recording device 12b, it is possible to achieve the same function, for example by attaching the specific setting information on the image signal processing, for example at the time of sending the image signal.

Figure 3:
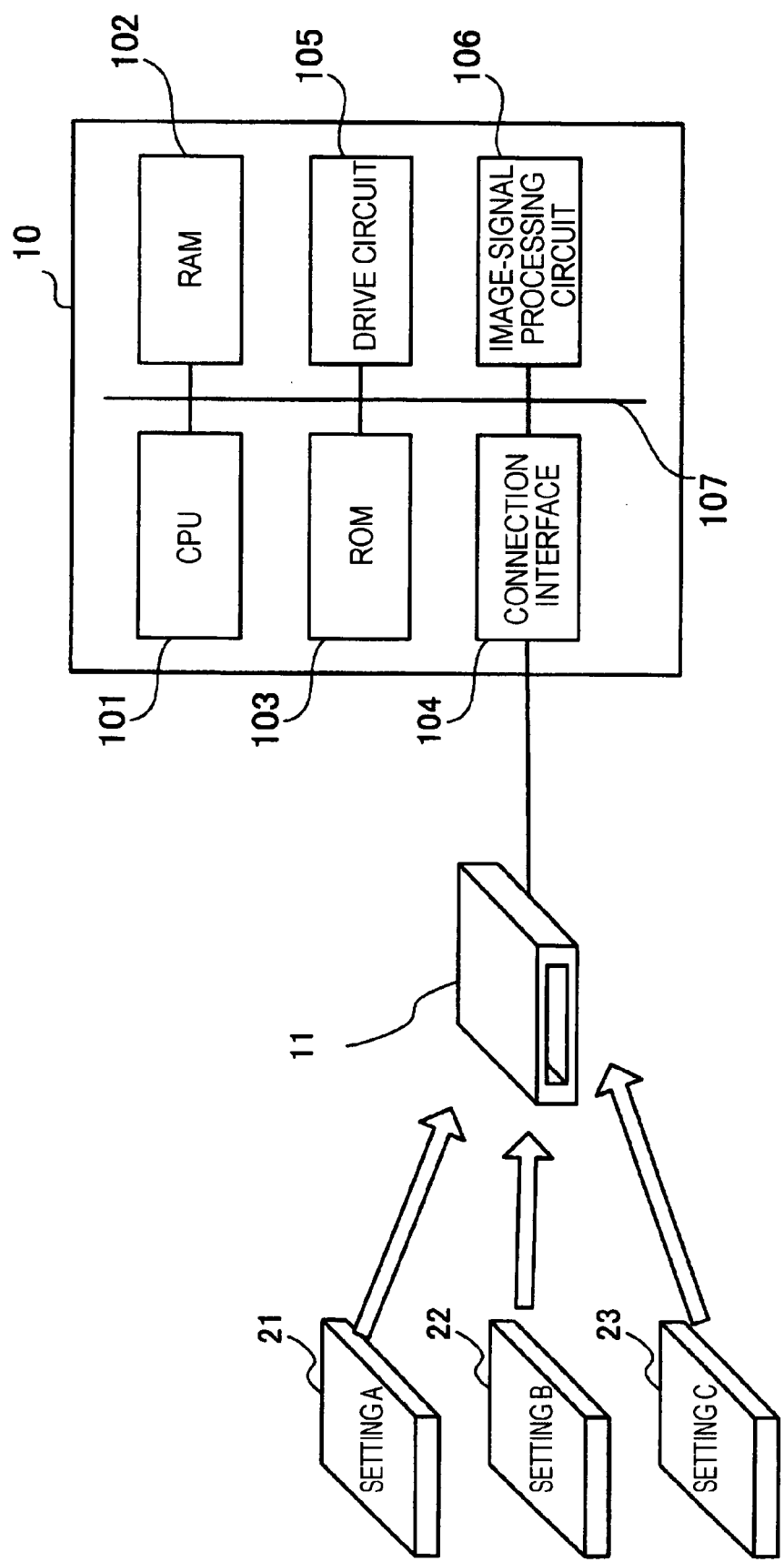
FIG. 3 is a block diagram illustrating the hardware configuration of a digital camera according to an embodiment of the present invention.

Next, a description will be given of the hardware configuration of a digital camera according to an embodiment of the present invention. FIG. 3 is a block diagram illustrating the hardware configuration of a digital camera according to an embodiment of the present invention.

A camera 10 is entirely controlled by a CPU (Central Processing Unit) 101. A RAM (Random Access Memory) 102, a ROM (Read Only Memory) 103, a connection interface 104, a drive circuit 105, and an image-signal processing circuit 106 are connected to the CPU 101 through a bus 107.

The RAM 102 temporarily stores at least part of the programs of an OS (Operating System) and application programs that are executed by the CPU 101. Also, the RAM 102 stores various kinds of data necessary for the processing by the CPU 101. The ROM 103 stores the OS and the application programs. A recording-medium reader/writer 11 is connected to the connection interface 104, and the recording-medium reader/writer 11 reads data from and writes data into a recording medium in accordance with the instructions from the CPU 101. A recording medium in which different characteristic setting information to be selected by the photographer is recorded is inserted into the recording-medium reader/writer 11. In the example shown in the figure, the user inserts one of the recording medium on which the label "setting A" is attached (in the following, referred to as a recording medium (setting A) 21, the recording medium on which the label "setting B" is attached (in the following, referred to as a recording medium (setting B) 22, and the recording medium on which the label "setting C is attached (in the following, referred to as a recording medium (setting C) 23 into the recording-medium reader/writer 11. Every time a recording medium with a different label is inserted, the setting information of the camera 10 is changed. The drive circuit 105 drives the imaging section on the basis of the setting information to generate an image signal. The image-signal processing circuit 106 performs signal processing based on the setting information for the generated signal information.

With such a hardware configuration, it is possible to achieve the processing function of the present embodiment. That is to say, the CPU 101 sequentially executes the programs stored in the ROM 103, thereby executing the functions of the setting-information reading means, which reads the specific setting information recorded in the recording media 21, 22, and 23 inserted into the recording-medium reader/writer 11, and the control means which writes the values of the read specific setting information into the setting information specifying the operations of the drive circuit 105 and the image-signal processing circuit 106.

In the following, a description will be given of a recording medium of the present embodiment.

As described above, the recording medium may be formed by an arbitrary recording medium, such as a magnetic tape, a magnetic disk, an optical disc, a semiconductor memory, etc.

Figure 4:
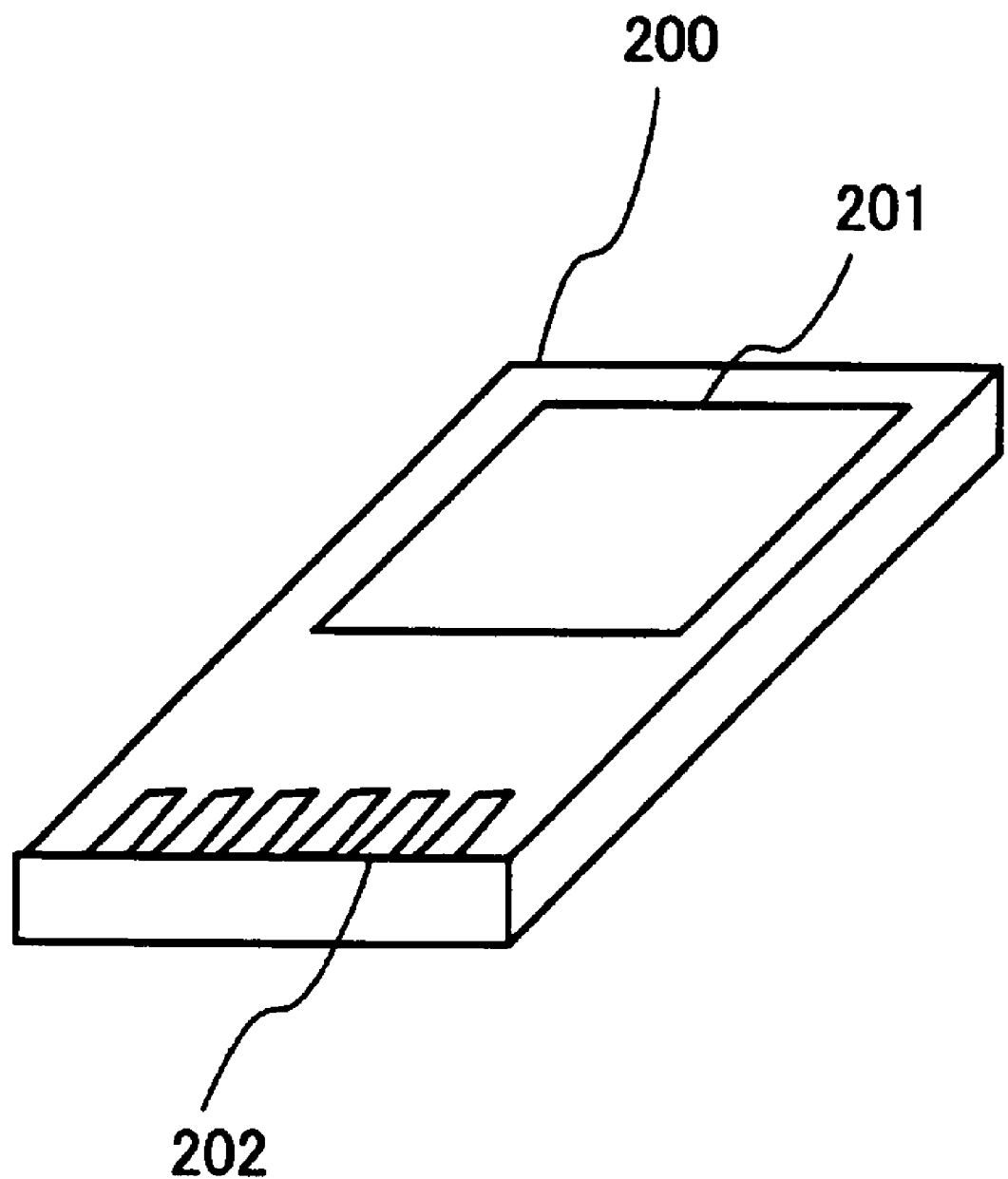
FIG. 4 is an example of a recording medium formed by a semiconductor memory according to the present embodiment.

FIG. 4 is an example of a recording medium formed by a semiconductor memory according to the present embodiment.

A semiconductor memory unit 200 has a semiconductor memory in the inside not shown in the figure. Reading data from and writing data to the semiconductor memory are carried out through a read/write terminal 202 disposed on the surface of the unit.

The storage area of the semiconductor memory includes a setting information area for storing the specific setting information and an image recording area for storing image information, and the respective area is fixedly set in advance. The camera 10 reads the specific setting information from the setting information area determined in advance, and sets the information in the setting information to be used by that camera.

A label 201 is attached to the surface of the main unit, and the information allowing to identify the specific setting information stored in the semiconductor memory unit 200 is described on the label.

Figure 5:
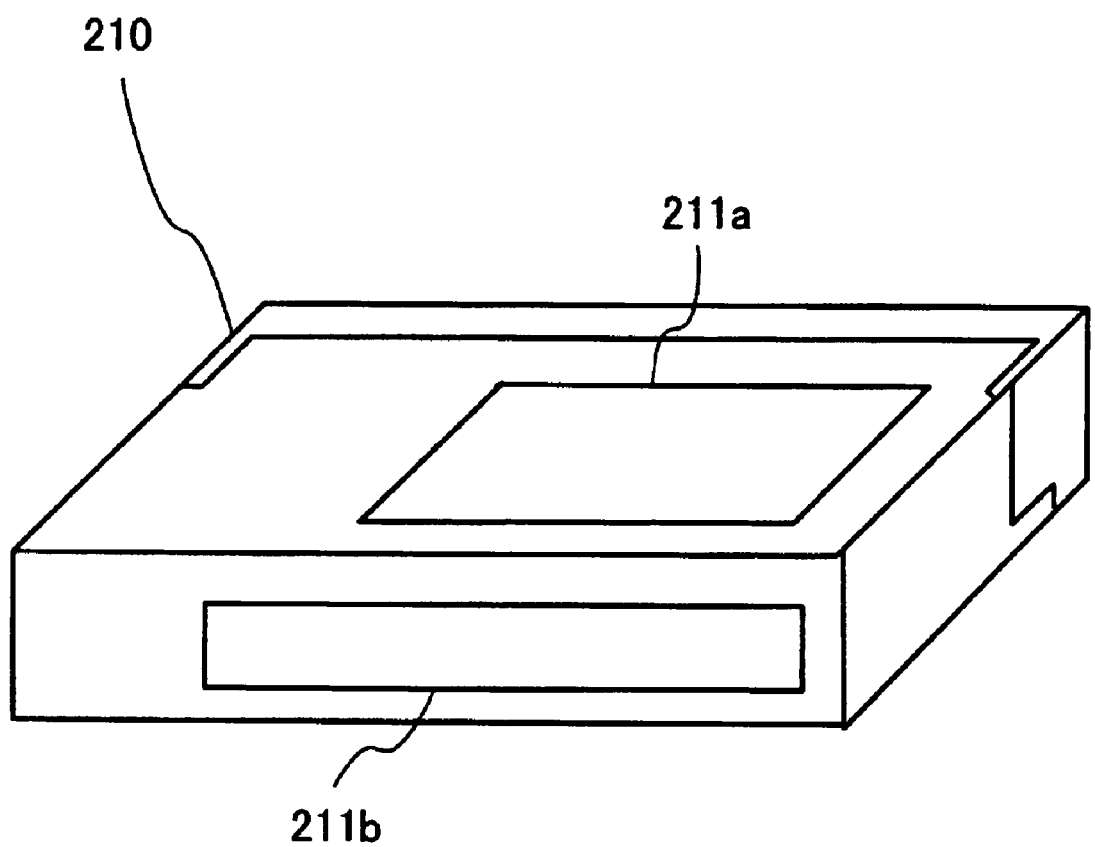
FIG. 5 is a first example of a recording medium formed by a magnetic tape according to the present embodiment.

FIG. 5 is a first example of a recording medium formed by a magnetic tape according to the present embodiment.

A magnetic-tape recording medium 210 has a magnetic tape in the inside not shown in the figure. The magnetic tape is provided with a setting information area storing specific setting information, for example at the beginning area of the tape. When the magnetic-tape recording medium 210 is inserted, the camera 10 reads the specific setting information recorded in the setting information area at the beginning of the tape, and sets the information in the setting information to be used by that camera.

The labels 211a and 211b are attached to the surface of the main unit, and the information identifying the specific setting information stored in the magnetic-tape recording medium 210 is described on the labels.

In this regard, the specific setting information is not only recorded in the magnetic tape, but also may be recorded in an IC chip, etc., which is embedded in the label 211a or the label 211b.

Figure 6:
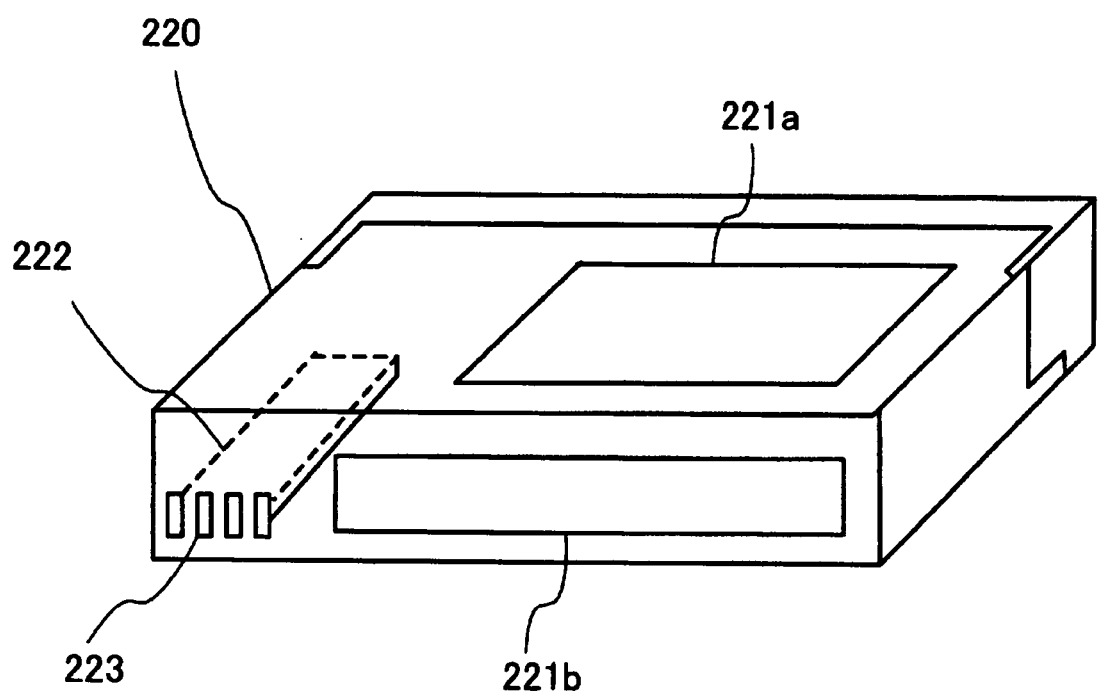
FIG. 6 is a second example of a recording medium formed by a magnetic tape according to the present embodiment.

FIG. 6 is a second example of a recording medium formed by a magnetic tape according to the present embodiment.

The magnetic-tape recording medium 220 is provided with a magnetic tape not shown in the figure, and a semiconductor memory 222 in the inside. The magnetic tape functions as image-reading means, and the semiconductor memory 222 is used for a recording area storing the specific setting information. The specific setting information stored in the semiconductor memory 222 is read out through a semiconductor memory read/write terminal 223.

The labels 221a and 221b are attached to the surface of the main unit, and the information identifying the specific setting information stored in the magnetic-tape recording medium 220 is described on the labels.

Next, a description will be given of specific setting information stored in the recording media 21, 22, and 23 in advance.

FIG. 7 is a diagram illustrating an example of the specific setting information according to the present embodiment.

In the example in the figure, white balance 320, sensitivity (gain) 330, gamma characteristic 340, and contour correction 350 are selected as the setting items for each type 310, and the setting values to be registered are shown. In this regard, "setting A" is assumed to be a setting value of the camera that allows to obtain the same image quality as a film A. In the same manner, "setting B" is assumed to allow obtaining the image quality of a film B, and "setting C" is assumed to allow obtaining the image quality of a film C.

For example, in the recording medium of which the type 310 is "standard", "daylight" is registered in the white balance 320, "standard" is registered in the sensitivity (gain) 330, "standard" is registered in the gamma characteristic 340, and "none" is registered in the contour correction 350.

Also, the recording medium (setting A) 21 records the specific setting information (white balance=tungsten, sensitivity=four times, gamma characteristic=gamma A, contour correction=weak), which allows to obtain the same result as the film A having the type 310 of "setting A".

The recording medium (setting B) 22 records the specific setting information (white balance=daylight, sensitivity=double, gamma characteristic=gamma B, contour correction=strong), which allows to obtain the same result as the film B having the type 310 of "setting B".

The recording medium (setting C) 23 records the specific setting information (white balance=tungsten, sensitivity=standard, gamma characteristic=gamma C, contour correction=normal), which allows to obtain the same result as the film C having the type 310 of "setting C".

In this regard, if the labels are the same, the setting values registered in the specific setting information become the same.

Figure 8:
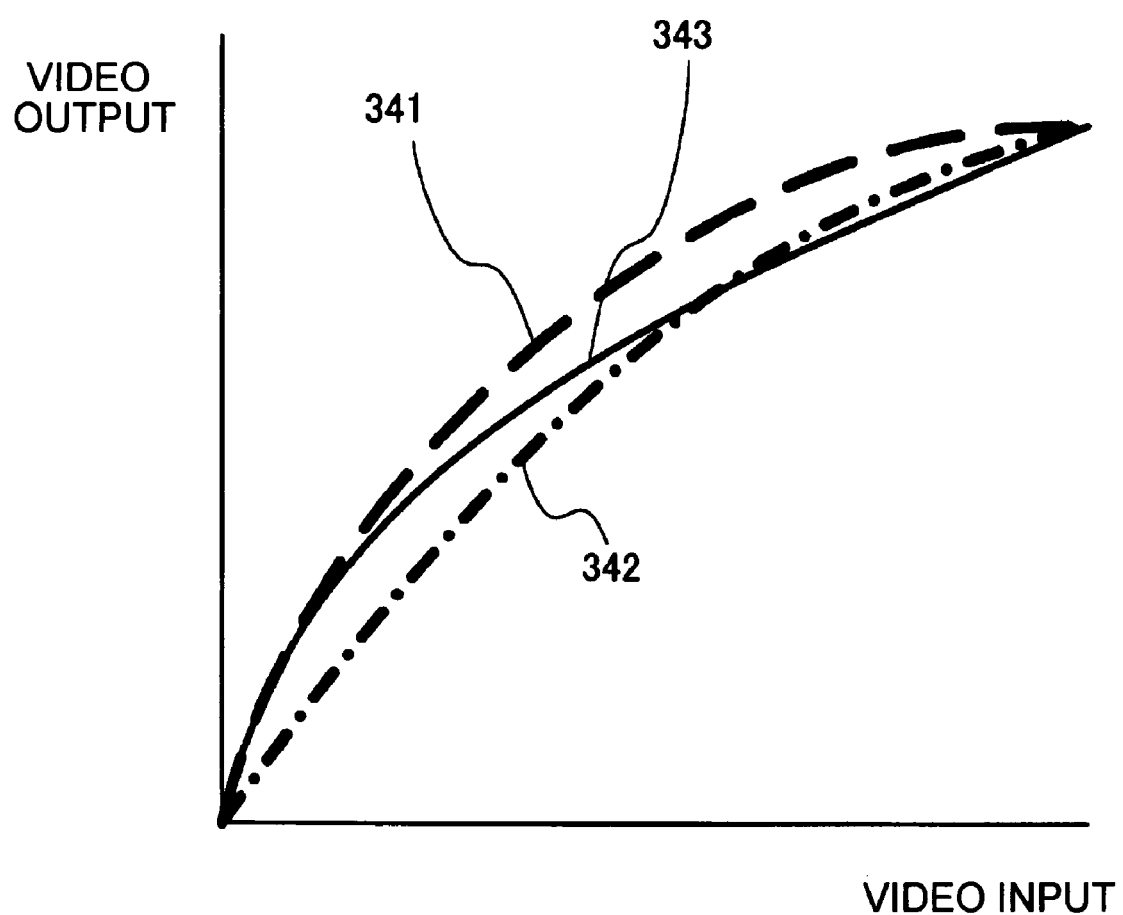
FIG. 8 is a diagram illustrating an example of the gamma characteristics to be set in the specific setting information.

FIG. 8 is a diagram illustrating an example of the gamma characteristics to be set in the specific setting information.

As shown in the figure, the gamma characteristics are different among the gamma A (341) registered in the recording medium of "setting A", the gamma B (342) registered in the recording medium of "setting B", and the gamma C (343) registered in the recording medium of "setting C". Different image qualities are obtained from individual characteristics.

Referring back to FIG. 3, a description will be given of the operation of a camera and the method of setting the quality of a captured image according to the present embodiment.

The recording medium (setting A) 21, the recording medium (setting B) 22, and recording medium (setting C) 23 record specific setting information for obtaining the same image quality as that of the film A, the film B, and the film C, respectively.

The photographer selects the recording medium allowing to obtain the intended image quality by referring to the label of each recording medium, and inserts the medium into the recording-medium reader/writer 11.

For example, if the recording medium (setting A) 21 having the label "setting A" is selected and is inserted into the recording-medium reader/writer 11, the camera 10 reads the specific setting information recorded in the recording medium (setting A) 21 through the connection interface 104, and writes the information into the specific-information recording area disposed in the RAM 102, etc. Alternatively, the camera 10 outputs the values of the specific setting information to the drive circuit 105 and the image-signal processing circuit 106. By this means, the camera 10 performs the imaging processing and the image signal processing in accordance with "setting A", and thus the photographer can obtain the same image quality as that of a desired film A.

Next, when the photographer takes out the recording medium (setting A) 21, and inserts the recording medium (setting B) 22, the specific setting information of "setting B" is newly read, and the setting information of the camera 10 is changed to the values of "setting B". Thereafter, the camera 10 performs the imaging processing and the image-signal processing in accordance with "setting B", and thus the photographer can obtain the same image quality as that of the film B.

It should be understood by those skilled in the art that various modifications, combinations, sub-combinations and alterations may occur depending on design requirements and other factors insofar as they are within the scope of the appended claims or the equivalents thereof.

What is claimed is:

1. An imaging apparatus operating on the basis of setting information determining quality of a captured image, the imaging apparatus comprising:
    imaging means for performing image processing in accordance with the setting information;
    image-signal processing means for performing signal processing of an image captured by the imaging means in accordance with the setting information;
    when a read request is input in a state of being connected with an image recording medium including setting-information recording means storing specific setting information recording a setting value for obtaining a specific image quality and image-information recording means recording image information including captured image data, setting-information reading means for reading the specific setting information stored in the setting-information recording means of the image recording medium, wherein the image recording medium includes a first recording medium and a second recording medium, the first recording medium comprising a different recording medium type than the second recording medium, the specific setting information stored only on the first recording medium and the captured image data stored only on the second recording medium; and
    control means for changing the setting information on the imaging means and the image-signal processing means on the basis of the specific setting information read by the setting-information reading means and controlling the imaging means and the image-signal processing means,
    in which the specific setting information represents the setting information pertaining to only one type of film such that the respective recording medium has the setting information pertaining to only the one type of film, and
    in which the setting-information reading means reads the specific setting information pertaining to only the one type of film stored in the image recording medium without ever a need for any selection of the setting information by a user,
    wherein the image recording medium is provided with identification allowing the setting information, including image capture settings, to be identified on a main-unit surface, or on a label attached to a main-unit surface or a main-unit side face.

2. The imaging apparatus according to claim 1, further comprising:
    connection detecting means for determining whether the image recording medium has been connected,
    wherein when the connection detecting means detects the image recording medium having been newly connected, the setting-information reading means reads the specific setting information, and the control means changes the setting information based on the specific setting information newly read by the setting-information reading means.

3. The imaging apparatus of claim 1 wherein the first recording medium comprises an IC chip and the second recording medium comprises a magnetic-tape.

4. The imaging apparatus of claim 3 wherein the setting information is recorded in both the first recording medium and the second recording medium.

5. The imaging apparatus of claim 1 wherein the first recording medium comprises a magnetic tape and the second recording medium comprises a semiconductor memory.

6. A nontransitory image recording medium for recording image information including image data generated by an imaging apparatus operating on the basis of setting information determining quality of a captured image, the image recording medium comprising:
    image-information recording means for recording the image information to be written by the imaging apparatus through image-information writing means of the imaging apparatus; and
    setting-information recording means for recording specific setting information recording a setting value for obtaining a specific image quality read by setting-information reading means of the imaging apparatus when the imaging apparatus sets the setting information,
    in which the specific setting information represents the setting information pertaining to only one type of film such that the respective recording medium has the setting information pertaining to only the one type of film,
    wherein the image recording medium is provided with identification allowing the setting information, including image capture settings, to be identified on a main-unit surface, or on a label attached to a main-unit surface or a main-unit side face, and
    wherein the image recording medium includes a first recording medium and a second recording medium, the first recording medium comprising a different recording medium type than the second recording medium, the specific setting information stored only on the first recording medium and the image data stored only on the second recording medium.

7. The nontransitory image recording medium according to claim 6,
    wherein the identification is given on a package covering the image recording medium.

8. The nontransitory image recording medium according to claim 6,
    wherein the setting-information recording means is disposed in part of the image-information recording means.

9. The nontransitory image recording medium according to claim 6,
    wherein the setting-information recording means is disposed as part of a label attached to a main-unit surface or a main-unit side face of the image recording medium.

10. A method of setting quality of an image captured by an imaging apparatus operating on the basis of setting information determining quality of a captured image, the method comprising the steps of:
    when a read request is input in a state of being connected with an image recording medium including image-information recording means for recording image information including image data generated by the imaging apparatus and setting-information recording means for recording specific setting information recording a setting value for obtaining a specific image quality, reading the specific setting information stored in the setting-information recording means of the image recording medium by use of setting-information reading means; and controlling changing the setting-information value on imaging means for performing image processing and image-signal processing means for processing an image signal captured by the imaging means on the basis of the specific setting information read by setting-information reading means and controlling the imaging means and the image-signal processing means, in which the specific setting information represents the setting information pertaining to only one type of film such that the respective recording medium has the setting information pertaining to only the one type of film, and in which the setting-information reading means reads the specific setting information pertaining to only the one type of film stored in the image recording medium without ever a need for any selection of the setting information by a user, wherein the image recording medium is provided with identification allowing the setting information, including image capture settings, to be identified on a main-unit surface, or on a label attached to a main-unit surface or a main-unit side face, and wherein the image recording medium includes a first recording medium and a second recording medium, the first recording medium comprising a different recording medium type than the second recording medium, the specific setting information stored only on the first recording medium and the image data stored only on the second recording medium.

11. An imaging apparatus operating on the basis of setting information determining quality of a captured image, the imaging apparatus comprising:

an imaging mechanism for performing image processing in accordance with the setting information;

an image-signal processing mechanism for performing signal processing of an image captured by the imaging mechanism in accordance with the setting information;

when a read request is input in a state of being connected with an image recording medium including a setting-information recording mechanism storing specific setting information recording a setting value for obtaining a specific image quality and an image-information recording mechanism recording image information including captured image data, a setting-information reading mechanism for reading the specific setting information stored in the setting-information recording mechanism of the image recording medium; and a control mechanism for changing the setting information on the imaging mechanism and the image-signal processing mechanism on the basis of the specific setting information read by the setting-information reading mechanism and controlling the imaging mechanism and the image-signal processing mechanism, in which the specific setting information represents the setting information pertaining to only one type of film such that the respective recording medium has the setting information pertaining to only the one type of film, and in which the setting-information reading mechanism reads the specific setting information pertaining to only the one type of film stored in the image recording medium without ever a need for any selection of the setting information by a user, wherein the image recording medium is provided with identification allowing the setting information, including image capture settings, to be identified on a main-unit surface, or on a label attached to a main-unit surface or a main-unit side face, and wherein the image recording medium includes a first recording medium and a second recording medium, the first recording medium comprising a different recording medium type than the second recording medium, the specific setting information stored only on the first recording medium and the captured image data stored only on the second recording medium.

12. An imaging apparatus usable with an exchangeable storage device selected by a user from among a number of storage devices, said apparatus comprising:

an imaging device to perform image processing in accordance with setting information;

an image-signal processing device to perform signal processing of the image captured by the imaging device in accordance with the setting information;

a setting-information reading device to read setting information stored in the storage device selected by the user after the selected storage device is inserted into said imaging apparatus; and a control device to change the setting information on the imaging device and the image-signal processing device in accordance with the setting information read by the setting-information recording device and controlling the imaging device and the image-signal processing device, in which the setting information stored in the selected storage device represents specific setting information pertaining to only one type of film such that the selected storage device has the setting information pertaining to only the one type of film, and in which the setting-information reading device reads the specific setting information pertaining to only the one type of film stored in the selected storage device without ever a need for any selection of the setting information by the user, wherein the storage device is provided with identification allowing the setting information, including image capture settings, to be identified on a main-unit surface, or on a label attached to a main-unit surface or a main-unit side face, and wherein the storage device includes a first recording medium and a second recording medium, the first recording medium comprising a different recording medium type than the second recording medium, the specific setting information stored only on the first recording medium and the captured image stored only on the second recording medium.

13. The imaging apparatus according to claim 12, further comprising a connection detecting device to determine whether the selected storage device has been inserted into said imaging apparatus, and when the connection detecting device detects that the selected storage device has been inserted into said imaging apparatus, the setting-information reading device automatically reads the specific setting information, and the control device changes the setting information based on the specific setting information newly read by the setting-information reading device.

* * * * *